United States Patent
Zhong

(10) Patent No.: US 12,518,778 B1
(45) Date of Patent: Jan. 6, 2026

(54) RECORD PLAYER WITH REPEATABLE PLAYBACK

(71) Applicant: DONGGUAN ALLLIKE ELECTRONICS CO., LTD., Dongguan (CN)

(72) Inventor: Xiqing Zhong, Dongguan (CN)

(73) Assignee: DONGGUAN ALLLIKE ELECTRONICS CO., LTD., Dongguan (CN)

(*) Notice: Subject to any disclaimer, the term of this patent is extended or adjusted under 35 U.S.C. 154(b) by 0 days.

(21) Appl. No.: 19/053,826

(22) Filed: Feb. 14, 2025

(30) Foreign Application Priority Data

Dec. 31, 2024 (CN) .......................... 202423322249.2

(51) Int. Cl.
  *G11B 3/08* (2006.01)
  *G11B 3/06* (2006.01)
  *G11B 3/085* (2006.01)
  *G11B 3/095* (2006.01)
  *G11B 19/02* (2006.01)

(52) U.S. Cl.
  CPC .............. *G11B 3/06* (2013.01); *G11B 3/0857* (2013.01); *G11B 3/095* (2013.01); *G11B 19/027* (2013.01)

(58) Field of Classification Search
  CPC ............ G11B 3/08512; G11B 3/05522; G11B 3/0957; G11B 3/06; G11B 3/085; G11B 3/09; G11B 27/028; G11B 27/034; G11B 3/08525; G11B 20/10037; G11B 11/20; G11B 20/02; G11B 19/00; G11B 27/027
  USPC ......................................................... 369/222
  See application file for complete search history.

(56) References Cited

U.S. PATENT DOCUMENTS 4,171,817 A * 10/1979 Iyeta .................. G11B 3/08512
                                                          369/220

FOREIGN PATENT DOCUMENTS

| CN | 207009078 U | 2/2018 |
| CN | 108766482 A | 11/2018 |
| CN | 219246373 U | 6/2023 |

* cited by examiner

*Primary Examiner* — Nabil Z Hindi
(74) *Attorney, Agent, or Firm* — Nitin Kaushik

(57) ABSTRACT

The present invention relates to the technical field of record players, and in particular, to a record player with repeatable playback, including a fixing base; and a tone arm body, a tone arm shaft, a circuit control assembly, a lifting and sliding mechanism, and a horizontal swinging mechanism that are disposed on the fixing base respectively. An upper end of the tone arm shaft is connected to one end of the tone arm body, and the tone arm shaft is rotatably disposed on the fixing base. The circuit control assembly includes a support frame; and a control circuit board, an encoder component, a rotating arm positioning component, and an induction gear that are disposed on the support frame. A gear transmission structure is disposed on one side, close to the gear, of the rotating arm positioning component.

5 Claims, 3 Drawing Sheets

RECORD PLAYER WITH REPEATABLE PLAYBACK

CROSS-REFERENCE TO RELATED APPLICATIONS

The application claims priority to Chinese patent application No. 202423322249.2, filed on Dec. 31, 2024, the entire contents of which are incorporated herein by reference.

TECHNICAL FIELD

The present invention relates to the technical field of record players, and in particular, to a record player with repeatable playback.

BACKGROUND

In the field of traditional record players, most of the operations of the tone arm rely on mechanical structures to implement basic playback functions such as needle dropping for playback and tone arm lifting for pause. Although this type of mechanical automatic movement has a simple structure and low costs, functions are relatively single, and complex operations such as remote control operations, fast forward, fast rewind, and repeated playback in a designated region cannot be implemented. With the advancement of science and technology and the improvement of requirements of customers for music playback experience, traditional record players can no longer meet the needs of modern people.

At present, although there are attempts to introduce electronic technology to some high-end record players to improve the control of the tone arm, most of them only stay at simple electric lifting and lowering and rotation. For example, according to the patent applied by the applicant in 2022 (a record player with an electric rotating arm function disclosed in the application No. 202221887553.X), position control is implemented through the position sensor and the playback mode cannot be enriched. In addition, these systems often do not have remote control functions, which limits the operation convenience of the user.

SUMMARY

In view of problems in the prior art, the present invention provides a record player with repeatable playback, which is novel in structure and ingenious in design. An encoder component encodes a rotary angle of a tone arm, and therefore, a position of a record may be recognized. An external control terminal is wirelessly connected to a control circuit board through a wireless communication module, the external control terminal locates a playback region of a track according to code of the encoder component, and the control circuit board controls a lifting and sliding mechanism and a horizontal swinging mechanism to work according to control information provided by the external control terminal, to drive a tone arm body to rotate to an encoded position, thereby selecting a corresponding playback region of the track for playback, so that a selectable region playback function and a repeatable playback function of the present invention are implemented.

To resolve the above technical problems, the following technical solutions are used in the present invention:

The present invention provides a record player with repeatable playback, including a fixing base; and a tone arm body, a tone arm shaft, a circuit control assembly, a lifting and sliding mechanism, and a horizontal swinging mechanism that are disposed on the fixing base respectively, where the lifting and sliding mechanism is configured to control a tone arm to lift and lower, the horizontal swinging mechanism is configured to control the tone arm shaft to rotate, an upper end of the tone arm shaft is connected to one end of the tone arm body, and the tone arm shaft is rotatably disposed on the fixing base; the circuit control assembly includes a support frame, a control circuit board disposed on the support frame, an encoder component disposed on the support frame, a rotating arm positioning component rotatably disposed on the support frame, and an induction gear rotatably disposed on the support frame, a gear transmission structure is disposed on one side, close to the gear, of the rotating arm positioning component, the gear transmission structure is in engagement and transmission connection with the induction gear, and a lower end of the tone arm shaft is connected to one end of the rotating arm positioning component; and a connecting shaft is connected to a middle portion of the induction gear, the connecting shaft is rotatably disposed on the support frame, the connecting shaft is connected to the encoder component, the encoder component, the lifting and sliding mechanism, and the horizontal swinging mechanism are electrically connected to the control circuit board respectively, and a wireless communication module is further connected to the control circuit board.

Preferably, the encoder component includes a magnet fixing fitting, a radial magnet, and a magnetic encoder, the support frame is further provided with an encoder retaining groove in a recessed manner, the magnet fixing fitting is configured to fix the radial magnet, the magnetic encoder is welded and fixed on the control circuit board, the radial magnet is rotatably disposed above the magnetic encoder, and the encoder component is located in the encoder retaining groove.

Preferably, the control circuit board is further provided with at least one position induction switch, and an induction structure that matches and senses the position induction switch is disposed at the other end of the rotating arm positioning component.

Preferably, the wireless communication module is a WIFI module or/and a Bluetooth module.

Preferably, the wireless communication module is an infrared receiver.

Beneficial effects of the present invention are as follows:

The present invention is novel in structure and ingenious in design. When the present invention works, the lifting and sliding mechanism is configured to control the tone arm to lift and lower, the horizontal swinging mechanism is configured to control the tone arm shaft to rotate, and the upper end of the tone arm shaft is connected to one end of the tone arm body to drive the tone arm body to rotate. In addition, the tone arm shaft drives the rotating arm positioning component to rotate while rotating, and the rotating arm positioning component drives the induction gear to rotate through a matching and engagement connection between the gear transmission structure and the induction gear while rotating. The induction gear rotates synchronously with the connecting shaft, the radial magnet is fixed to the connecting shaft through the magnet fixing fitting, and the radial magnet matches and senses the magnetic encoder on the encoder component. The magnetic encoder on the encoder component is configured to sense a rotary angle of the connecting shaft, thereby sensing different positions of the tone arm body, and the rotary angle of the tone arm is encoded through the encoder component. Therefore, the position of the record may be recognized. The external control terminal is wirelessly connected to the control circuit board through the wireless communication module, the external control terminal locates the playback region of the track according to the code of the encoder component, and the control circuit board controls the lifting and sliding mechanism and the horizontal swinging mechanism to work according to the control information provided by the external control terminal, to drive the tone arm body to rotate to the encoded position, thereby selecting the corresponding playback region of the track for playback, so that the selectable region playback function and the repeatable playback function of the present application are implemented.

Figure 1:
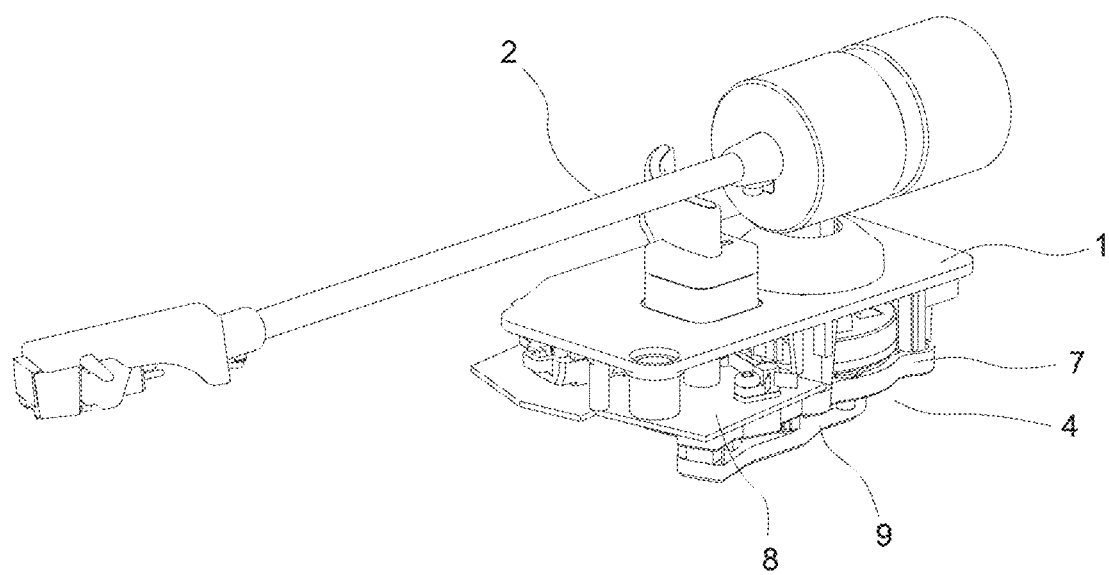
FIG. 1 is a schematic structural diagram of a record player with repeatable playback according to the present invention.
Figure 2:
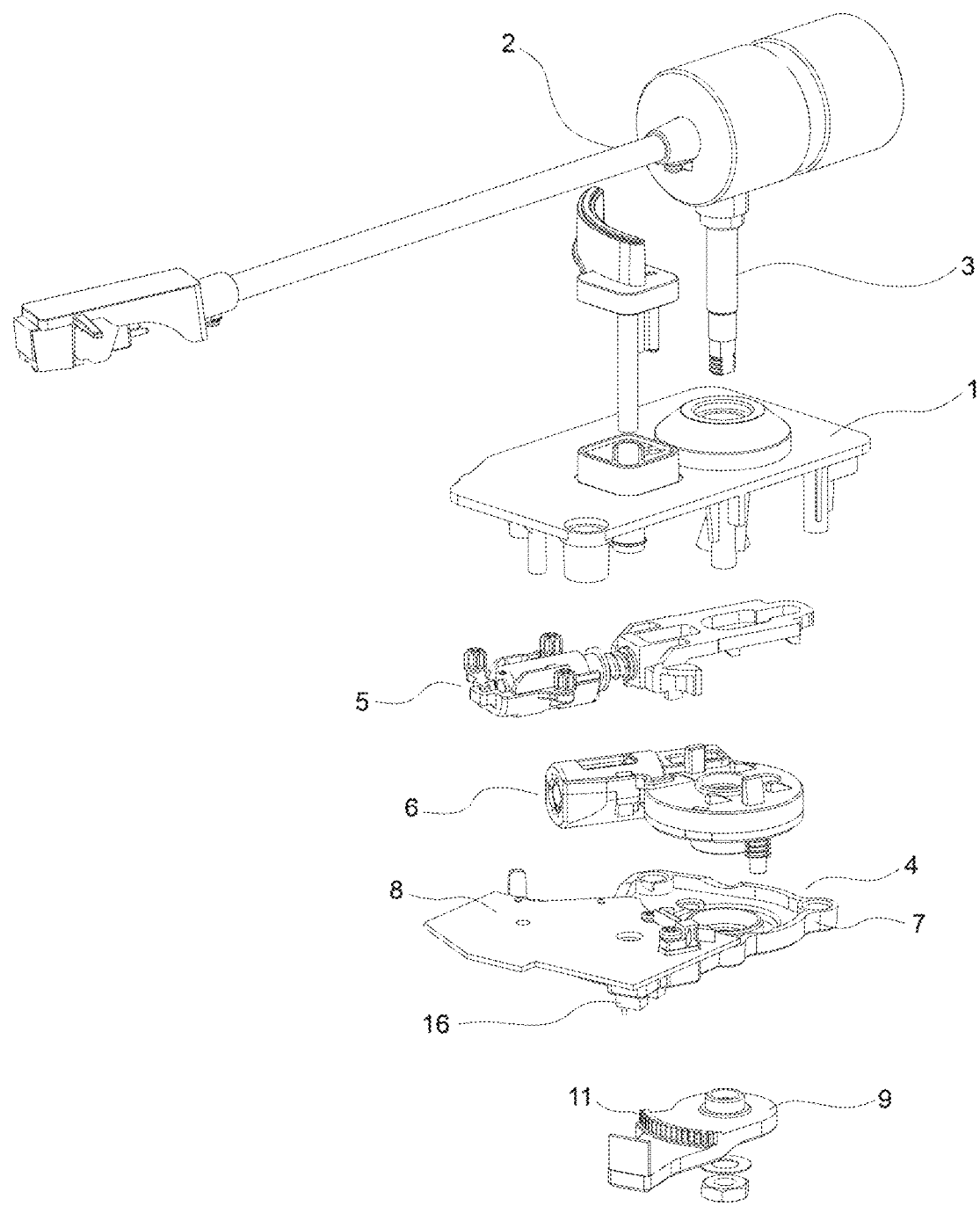
FIG. 2 is a structural exploded view of a record player with repeatable playback according to the present invention.
Figure 3:
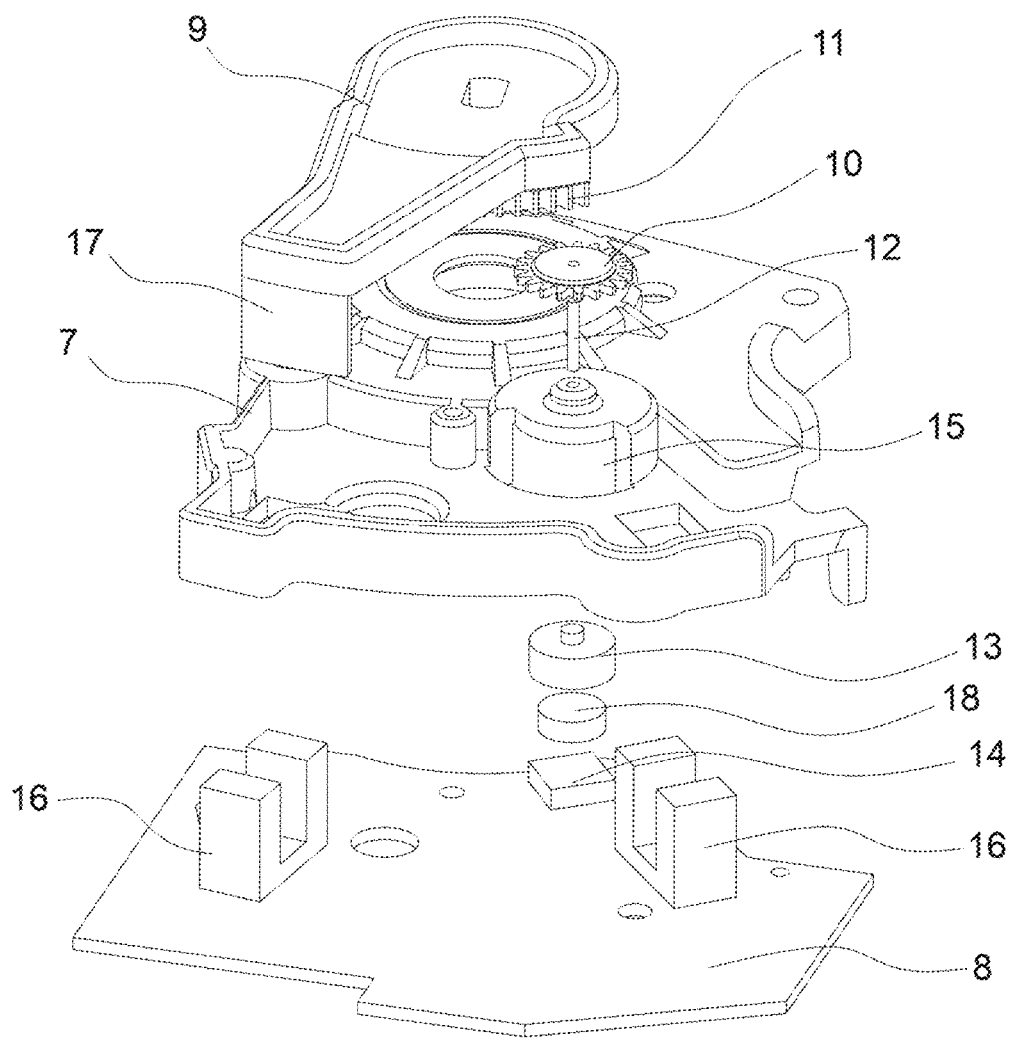
FIG. 3 is a structural exploded view of a circuit control assembly according to the present invention.

Reference numerals in FIG. 1 to FIG. 3 include:
1. fixing base; 2. tone arm body; 3. tone arm shaft; 4. circuit control assembly; 5. lifting and sliding mechanism; 6. horizontal swinging mechanism; 7. support frame; 8. control circuit board; 9. rotating arm positioning component; 10. induction gear; 11. gear transmission structure; 12. connecting shaft; 13. magnet fixing fitting; 14. magnetic encoder; 15. encoder retaining groove; 16. position induction switch; 17. induction structure; 18. radial magnet.

DETAILED DESCRIPTION OF THE EMBODIMENTS

For ease of understanding of a person skilled in the art, the present invention is further described below with reference to embodiments and accompanying drawings, and content mentioned in implementations are not intended to limit the present invention. The present invention is described in detail below with reference to the accompanying drawings.

Embodiment 1

According to Embodiment 1 of the present application, as shown in FIG. 1 to FIG. 3, a record player with repeatable playback is provided and includes a fixing base 1; and a tone arm body 2, a tone arm shaft 3, a circuit control assembly 4, a lifting and sliding mechanism 5, and a horizontal swinging mechanism 6 that are disposed on the fixing base 1 respectively. The lifting and sliding mechanism 5 is configured to control a tone arm to lift and lower, the horizontal swinging mechanism 6 is configured to control the tone arm shaft 3 to rotate, an upper end of the tone arm shaft 3 is connected to one end of the tone arm body 2, and the tone arm shaft 3 is rotatably disposed on the fixing base 1. Both the lifting and sliding mechanism 5 and the horizontal swinging mechanism 6 are the prior art (roughly the same as a structure of a record player with electric rotating arm function disclosed in an application No. 202221887553.X). The circuit control assembly 4 includes a support frame 7, a control circuit board 8 disposed on the support frame 7, an encoder component disposed on the support frame 7, a rotating arm positioning component 9 rotatably disposed on the support frame 7, and an induction gear 10 rotatably disposed on the support frame 7. A gear transmission structure 11 is disposed on one side, close to the gear, of the rotating arm positioning component 9, the gear transmission structure 11 is in engagement and transmission connection with the induction gear 10, and a lower end of the tone arm shaft 3 is connected to one end of the rotating arm positioning component 9. A connecting shaft 12 is connected to a middle portion of the induction gear 10, the connecting shaft 12 is rotatably disposed on the support frame 7, the connecting shaft 12 is connected to the encoder component, and the encoder component, the lifting and sliding mechanism 5, and the horizontal swinging mechanism 6 are electrically connected to the control circuit board 8 respectively. A wireless communication module is further connected to the control circuit board 8, and as a peripheral circuit, the wireless communication module facilitates a signal connection with an external terminal. Specifically, the present invention is novel in structure and ingenious in design. When the present invention works, the lifting and sliding mechanism 5 is configured to control the tone arm to lift and lower, the horizontal swinging mechanism 6 is configured to control the tone arm shaft 3 to rotate, and the upper end of the tone arm shaft 3 is connected to one end of the tone arm body 2 to drive the tone arm body 2 to rotate. In addition, the tone arm shaft 3 drives the rotating arm positioning component 9 to rotate while rotating, and the rotating arm positioning component 9 drives the induction gear 10 to rotate through a matching and engagement connection between the gear transmission structure 11 and the induction gear 10 while rotating. The induction gear 10 rotates synchronously with the connecting shaft 12, and the encoder component matches and senses the connecting shaft 12. The encoder component is configured to sense a rotary angle of the connecting shaft 12, thereby sensing different positions of the tone arm body 2, and a rotary angle of the tone arm is encoded through the encoder component. Therefore, a position of a record may be recognized. An external control terminal is wirelessly connected to the control circuit board 8 through the wireless communication module, the external control terminal locates a playback region of a track according to code of the encoder component, and the control circuit board 8 controls the lifting and sliding mechanism 5 and the horizontal swinging mechanism 6 to work according to control information provided by the external control terminal, to drive the tone arm body 2 to rotate to an encoded position, thereby selecting a corresponding playback region of the track for playback, so that a selectable region playback function of the embodiment of the present application is implemented. In addition, since the tone arm body 2 may be driven to rotate to the encoded position, the tone arm body 2 may also be driven to rotate to a region where the track is played, so that a repeatable playback function is implemented.

In the embodiment of the present application, the encoder component includes a magnet fixing fitting 13, a radial magnet 18, and a magnetic encoder 14. The support frame 7 is further provided with an encoder retaining groove 15 in a recessed manner. The magnet fixing fitting 13 is configured to fix the radial magnet 18, the magnetic encoder 14 is welded and fixed on the control circuit board 8, the radial magnet 18 is rotatably disposed above the magnetic encoder 14, the radial magnet 18 and the magnetic encoder 14 are fixed in a non-contact manner, and the encoder component is located in the encoder retaining groove 15. Specifically, under the disposing, during working, the connecting shaft 12 is connected to the radial magnet 18 after passing through the support frame 7 and the magnet fixing fitting 13, and the connecting shaft 12 drives the radial magnet 18 to rotate when rotating, so that the magnetic encoder 14 outputs an encoded signal of an angle position through relative angular displacement between the radial magnet 18 and the magnetic encoder 14. The encoder retaining groove 15 plays a role of avoidance and is configured to accommodate the encoder component, so that a volume of the record player may be reduced to a great extent, and a structure is compact.

In the embodiment of the present application, the control circuit board 8 is further provided with at least one position induction switch 16, and an induction structure 17 that matches and senses the position induction switch 16 is disposed at the other end of the rotating arm positioning component 9. The position induction switch 16 is disposed along a movement path of the induction structure 17. Specifically, if two position induction switches 16 are disposed, the two position induction switches 16 correspond to a playback start position and a playback end position. If more position induction switches 16 are disposed, the position induction switches may correspond to positions corresponding to different sizes of records. The position induction switch 16 is the prior art, for example, a photoelectric sensor is used to sense an optical signal.

In the embodiment of the present application, the wireless communication module is a WIFI module or/and a Bluetooth module. Specifically, under the disposing, the record player may be connected to an intelligent terminal (for example, a mobile phone and a tablet) of a user through the WIFI module or/and the Bluetooth module. After the connection is completed, the user may control a position of the tone arm of the record player through a corresponding application (APP) or mini program of the intelligent terminal, thereby implementing remote control, so that convenience is improved, and user experience is improved.

Embodiment 2

Embodiment 2 of the present application differs from Embodiment 1 in that: the wireless communication module is an infrared receiver. Specifically, under the disposing, the user may send a signal to the infrared receiver by using an infrared remote control, to control the tone arm of the record player, thereby improving use flexibility.

The above-described embodiments are only preferred embodiments of the present invention and constitute no restriction in any form on the present invention. Although the present invention has been disclosed above with preferred embodiments, such preferred embodiments are not intended to limit the present invention, and any person skilled in the art can make some changes or modifications to equivalent embodiments with equivalent changes by reference to the technical content disclosed above without departing from the scope of the technical solutions of the present invention. However, any simple revisions, equivalent changes, and modifications made to the above embodiments in accordance with the technical essence of the present invention without departing from the content of the technical solutions of the present invention shall still fall within the scope of the technical solutions of the present invention.

What is claimed is:

1. A record player with repeatable playback, comprising a fixing base; and a tone arm body, a tone arm shaft, a circuit control assembly, a lifting and sliding mechanism, and a horizontal swinging mechanism that are disposed on the fixing base respectively, wherein the lifting and sliding mechanism is configured to control a tone arm to lift and lower, the horizontal swinging mechanism is configured to control the tone arm shaft to rotate, an upper end of the tone arm shaft is connected to one end of the tone arm body, and the tone arm shaft is rotatably disposed on the fixing base; the circuit control assembly comprises a support frame, a control circuit board disposed on the support frame, an encoder component disposed on the support frame, a rotating arm positioning component rotatably disposed on the support frame, and an induction gear rotatably disposed on the support frame, a gear transmission structure is disposed on one side, close to the gear, of the rotating arm positioning component, the gear transmission structure is in engagement and transmission connection with the induction gear, and a lower end of the tone arm shaft is connected to one end of the rotating arm positioning component; and a connecting shaft is connected to a middle portion of the induction gear, the connecting shaft is rotatably disposed on the support frame, the connecting shaft is connected to the encoder component, the encoder component, the lifting and sliding mechanism, and the horizontal swinging mechanism are electrically connected to the control circuit board respectively, and a wireless communication module is further connected to the control circuit board.

2. The record player with repeatable playback according to claim 1, wherein the encoder component comprises a magnet fixing fitting, a radial magnet, and a magnetic encoder, the support frame is further provided with an encoder retaining groove in a recessed manner, the magnet fixing fitting is configured to fix the radial magnet, the magnetic encoder is welded and fixed on the control circuit board, the radial magnet is rotatably disposed above the magnetic encoder, and the encoder component is located in the encoder retaining groove.

3. The record player with repeatable playback according to claim 1, wherein the control circuit board is further provided with at least one position induction switch, and an induction structure that matches and senses the position induction switch is disposed at the other end of the rotating arm positioning component.

4. The record player with repeatable playback according to claim 1, wherein the wireless communication module is a WIFI module or/and a Bluetooth module.

5. The record player with repeatable playback according to claim 1, wherein the wireless communication module is an infrared receiver.

* * * * *